(12) United States Patent
Umayahara

(10) Patent No.: US 8,277,990 B2
(45) Date of Patent: Oct. 2, 2012

(54) FUEL CELL SYSTEM

(75) Inventor: Kenji Umayahara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1273 days.

(21) Appl. No.: 11/913,376

(22) PCT Filed: Mar. 31, 2006

(86) PCT No.: PCT/JP2006/307404
§ 371 (c)(1),
(2), (4) Date: Nov. 1, 2007

(87) PCT Pub. No.: WO2006/120822
PCT Pub. Date: Nov. 16, 2006

(65) Prior Publication Data
US 2009/0017350 A1    Jan. 15, 2009

(30) Foreign Application Priority Data
May 2, 2005    (JP) ................................. 2005-133988

(51) Int. Cl.
*H01M 8/04* (2006.01)
(52) U.S. Cl. ............................ 429/428; 429/443; 429/430
(58) Field of Classification Search ............ 429/428–451
See application file for complete search history.

(56) References Cited

U.S. PATENT DOCUMENTS

| | | | |
|---|---|---|---|
| 5,646,852 A * | 7/1997 | Lorenz et al. ................. | 429/430 |
| 6,342,316 B1 * | 1/2002 | Okamoto et al. ............. | 429/424 |
| 6,899,968 B2 * | 5/2005 | Hasuka et al. ................. | 429/431 |
| 2001/0024746 A1 | 9/2001 | Ueda et al. | |
| 2002/0095247 A1 * | 7/2002 | Ding et al. ....................... | 701/22 |
| 2002/0192518 A1 * | 12/2002 | Aoyagi et al. ................... | 429/23 |
| 2003/0022034 A1 * | 1/2003 | Suzuki ............................. | 429/13 |
| 2003/0094816 A1 * | 5/2003 | Kazama ...................... | 290/40 C |
| 2003/0217559 A1 * | 11/2003 | Ieda et al. ........................ | 62/230 |
| 2004/0028968 A1 * | 2/2004 | Okamoto ......................... | 429/23 |

(Continued)

FOREIGN PATENT DOCUMENTS

DE    43 22 765 C1    6/1994

(Continued)

OTHER PUBLICATIONS

Office Action issued Sep. 13, 2010, in German Patent Application No. 11 2006 001 072.7-32 ( with English translation).

*Primary Examiner* — Barbara Gilliam
*Assistant Examiner* — Edu E Enin-Okut
(74) *Attorney, Agent, or Firm* — Oblon, Spivak, McClelland, Maier & Neustadt, L.L.P.

(57) ABSTRACT

A fuel cell system for a vehicle, controlling a power generation amount of a fuel cell. A required power generation amount of the fuel cell and a target operational state corresponding to required power generation amount are calculated. An operational state of the fuel cell is detected. A correction power generation amount used for correcting the required power generation amount and an allowable power generation amount that the fuel cell can stably generate based on the operational state of the fuel cell are also calculated. Further, an output power generation amount of the fuel cell is determined based on a relation between the allowable power generation amount and the power generation amount obtained by correcting the required power generation amount by the correction power generation amount.

11 Claims, 9 Drawing Sheets

U.S. PATENT DOCUMENTS

2004/0234825 A1 11/2004 Numao et al.

FOREIGN PATENT DOCUMENTS

| | | |
|---|---|---|
| DE | 102 00 120 A1 | 8/2002 |
| EP | 1 262 361 | 12/2002 |
| JP | 7-75214 | 3/1995 |
| JP | 8-45527 | 2/1996 |
| JP | 2002-289238 | 10/2002 |
| JP | 2004-79451 | 3/2004 |
| JP | 2004-127748 | 4/2004 |

* cited by examiner

FUEL CELL SYSTEM

TECHNICAL FIELD

The present invention relates to a fuel cell system.

BACKGROUND ART

Recently, a fuel cell (fuel cell stack) is used as a power source of a vehicle. As for a fuel cell system executing control of power generation amount in such a fuel cell, various kinds of techniques are disclosed.

A technique of consuming the hydrogen by increasing the power generation amount in the fuel cell at the time of deceleration of the vehicle is disclosed in Japanese Patent Application aid-open under No. 2002-289238 (Reference-1), for example. A technique of consuming the hydrogen by continuing to generate electricity even after stopping supplying the hydrogen at the time of stopping of the fuel cell is disclosed in Japanese Patent Application Laid-open under No. 2004-79451 (Reference-2) and No. 2004-127748 (Reference-3). Additionally, in Japanese Patent Application Laid-open under No. 7-75214 (Reference-4), there is disclosed a technique of generating the electricity of the fuel cell at outputable power when required power of the fuel cell is larger than the outputable power thereof. Moreover, a technique of executing control to maintain a pressure difference between a cathode electrode and an anode electrode of the fuel cell within an allowable range is disclosed in Japanese Patent Application Laid-open under No. 8-45527 (Reference-5).

However, in the above technique according to Reference-1, by increase of the power generation amount at the time of the deceleration of the vehicle, the power amount equal to or larger than the power generation amount (hereinafter simply referred to as "allowable power generation amount") which the fuel cell can stably generate is outputted, and thus the hydrogen gas becomes insufficient. Thereby, the fuel cell is sometimes deteriorated. In addition, in the techniques according to Reference-2 to Reference-5, at the time of movement from an accelerating state to a decelerating state in the vehicle, the hydrogen more than originally needed is supplied to the fuel cell, and the large amount of non-reacted hydrogen is sometimes generated.

DISCLOSURE OF THE INVENTION

The present invention has been achieved in order to solve the above problems. It is an object of this invention to provide a fuel cell system capable of limiting power generation amount which a fuel cell outputs on the basis of allowable power generation amount which the fuel cell can stably generate, at the time of deceleration of a vehicle.

According to one aspect of the present invention, there is provided a fuel cell system including: a required power generation amount calculating unit which calculates required power generation amount of a fuel cell; a target operational state calculating unit which calculates a target operational state corresponding to the required power generation amount; an operational state detecting unit which detects an operational state of the fuel cell; a correction power generation amount calculating unit which calculates correction power generation amount used for correcting the required power generation amount based on a deviation between the target operational state and the detected operational state; an allowable power generation amount calculating unit which calculates allowable power generation amount which the fuel cell can stably generate based on the detected operational state; and an output power generation amount determining unit which determines output power generation amount of the fuel cell based on a relation between the allowable power generation amount and a power generation amount obtained by correcting the required power generation amount by the correction power generation amount.

The above fuel cell system is installed on a vehicle having a power source of the fuel cell and controls the power generation amount of the fuel cell. The required power generation amount calculating unit calculates the required power generation amount of the fuel cell, and the target operational state calculating unit calculates the target operational state corresponding to the required power generation amount. The operational state detecting unit detects the operational state of the fuel cell. In addition, the correction power generation amount calculating unit calculates the correction power generation amount used for correcting the required power generation amount, and the allowable power generation amount calculating unit calculates the allowable power generation amount which the fuel cell can stably generate on the basis of the operational state of the fuel cell. The output power generation amount determining unit determines the output power generation amount finally outputted from the fuel cell, based on the relation between the allowable power generation amount and the power generation amount obtained by correcting the required power generation amount by the correction power generation amount. Namely, the output power generation amount calculating unit determines the output power generation amount in consideration of the allowable power generation amount. Thus, according to the above fuel cell system, it becomes possible to effectively prevent the deterioration of the fuel cell due to gas insufficiency and instability of cell voltage, which can be caused by executing a process of increasing the power generation amount by the correction power generation amount when the required power generation amount is changed from a high load to a low load.

In a manner of the above fuel cell system, the output power generation amount determining unit may determine the allowable power generation amount as the output power generation amount when the power generation amount obtained by correcting the required power generation amount by the correction power generation amount is equal to or larger than the allowable power generation amount, and the output power generation amount determining unit may determine the power generation amount obtained by correcting the required power generation amount when the power generation amount obtained by correcting the required power generation amount by the correction power generation amount is smaller than the allowable power generation amount.

In this manner, the output power generation amount determining unit limits the output power generation amount by the allowable power generation amount. Concretely, the output power generation amount determining unit determines the allowable power generation amount as the output power generation amount when the sum of the required power generation amount and the correction power generation amount is equal to or larger than the allowable power generation amount. Therefore, the fuel cell system can obtain the power generation amount from the fuel cell within the range of the allowable power generation amount corresponding to the operational state. Thereby, when the required power generation amount decreases from the high load to the low load, it becomes possible to prevent occurrence of a problem such as the deterioration of the fuel cell and appropriately decompress the hydrogen gas pressure.

In another manner, the above fuel cell system further may include a storage device chargeable amount calculating unit which calculates chargeable amount of a storage device. The output power generation amount determining unit may determine a sum of the required power generation amount and the chargeable amount as the output power generation amount when the correction power generation amount is equal to or larger than the chargeable amount and the sum of the required power generation amount and the chargeable amount is smaller than the allowable power generation amount.

In this manner, the output power generation amount determining unit determines not only the allowable power generation amount but also the output power generation amount in consideration of the chargeable amount of the storage device. Concretely, the output power generation amount determining unit determines the sum of the required power generation amount and the chargeable amount as the output power generation amount when the correction power generation amount is equal to or larger than the chargeable amount and the sum of the required power generation amount and the chargeable amount is smaller than the allowable power generation amount. Namely, the output power generation amount is limited by the chargeable amount of the storage device. Thereby, it becomes possible to suppress the excessive current charge to the storage device and prevent the deterioration of the storage device. Conversely, when the chargeable amount is sufficiently large, the output power generation amount is not limited by the chargeable amount of the storage device. Thereby, the energy can be recovered by charging the excessive power occurring by decompression to the storage device, and the energy consumption necessary for traveling can be decreased.

In another manner of the above fuel cell system, the correction power generation amount calculating unit may calculate the correction power generation amount so that, as the deviation becomes larger, a degree of correcting the required power generation amount becomes larger.

In this manner, the correction power generation amount calculating unit calculates the correction power generation amount so that, as the deviation between the target operational state and the actual operational state becomes larger, the degree of correcting the required power generation amount becomes larger. Conversely, the correction power generation amount calculating unit calculates the correction power generation amount so that, as the deviation becomes smaller, the degree of correcting the required power generation amount becomes smaller. Namely, in feedback control for setting the operational state to the target operational state, when the deviation is large, a gain becomes large, and when the deviation is small, the gain becomes small. Thereby, when the deviation is large, convergence speed in the target operational state can increase. At the same time, when the deviation is small, a convergent property in the target operational state can be improved.

In another manner of the above fuel cell system, the correction power generation amount calculating unit may set the correction power generation amount to "0" when the required power generation amount is equal to or larger than a predetermined value.

In this manner, the correction power generation amount calculating unit sets the correction power generation amount to "0" when the required power generation amount is equal to or larger than the predetermined value, i.e., the correction power generation amount calculating unit does not correct the required power generation amount. That is, the unit does not execute the feedback control for setting to the targeted operational state. Thereby, when the required power generation amount is equal to or larger than the predetermined value, e.g., the vehicle is changed to the accelerated state again from the decelerated state, by using the gas pressure of the hydrogen sufficiently kept with respect to the required power generation amount, the necessary required power generation amount can be determined as the output power generation amount.

In another aspect of the present invention, there is provided a fuel cell system including: a required power generation amount calculating unit which calculates required power generation amount of a fuel cell; a target operational state calculating unit which calculates a target operational state corresponding to the required power generation amount; an operational state detecting unit which detects an operational state of the fuel cell; a correction power generation amount calculating unit which calculates correction power generation amount used for correcting the required power generation amount based on a deviation between the target operational state and the detected operational state; a storage device chargeable amount calculating unit which calculates chargeable amount of a storage device; and an output power generation amount determining unit which determines output power generation amount of the fuel cell based on a relation between the chargeable amount and a power generation amount obtained by correcting the required power generation amount by the correction power generation amount.

The above fuel cell system determines the output power generation amount in consideration of the chargeable amount of the storage device. Thereby, it becomes possible to suppress the excessive charge to the storage device and prevent the deterioration of the storage device. At the same time, by charging a power generation current to the storage device, the energy efficiency can be improved.

BRIEF DESCRIPTION OF THE REFERENCE NUMBER

Figure 1:
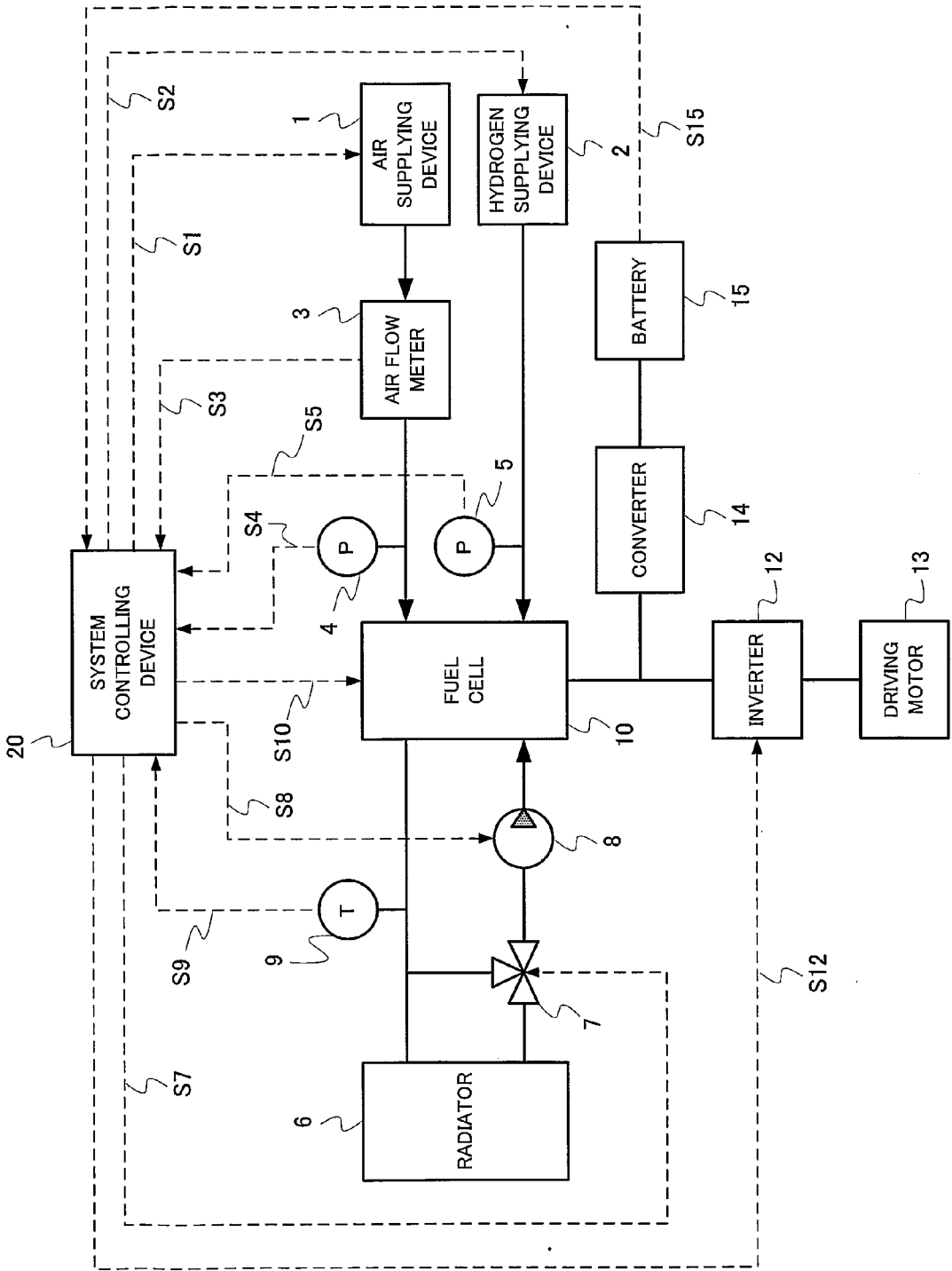
FIG. 1 is a block diagram schematically showing a configuration of a fuel cell system according to a first embodiment of the present invention.

1 Air supplying device
2 Hydrogen supplying device
3 Air flow meter
4 and 5 Pressure sensors
6 Radiator 9 Temperature sensor
10 Fuel cell
12 Inverter
13 Driving motor
15 Battery
20 System controlling device

BEST MODE FOR CARRYING OUT THE INVENTION

The preferred embodiments of the present invention will now be described below with reference to the attached drawings.

First Embodiment

A first embodiment of the present invention will be explained.
(Configuration of Fuel Cell System)
First, a description will be given of a configuration of the fuel cell system according to the first embodiment with reference to FIG. 1.

FIG. 1 shows a block diagram schematically showing a configuration of a vehicle on which the fuel cell system according to the first embodiment is provided. The vehicle is driven by power generated by a fuel cell (fuel cell stack) 10, and the fuel cell system controls the power generation of the fuel cell 10.

The vehicle mainly includes an air supplying device 1, a hydrogen supplying device 2, an air flow meter 3, pressure sensors 4 and 5, a radiator 6, a three-way valve 7, a cooling water pump 8, a temperature sensor 9, a fuel cell 10, an inverter 12, a driving motor 13, a converter 14, a battery (power storage device) 15 and a system controlling device 20.

In accordance with a control signal S1 supplied from the system controlling device 20, the air supplying device 1 inhales the air from the atmosphere to supply the air (oxygen) to the fuel cell 10. The air flow meter 3 detects the flow amount of the air supplied from the air supplying device 1 to output the detected flow amount to the system controlling device 20 as a signal S3. The pressure sensor 4 detects the pressure of the air supplied to the fuel cell 10 to output the detected pressure to the system controlling device 20 as a signal S4.

In accordance with a control signal S2 supplied from the system controlling device 20, the hydrogen supplying device 2 obtains the fuel (hydrogen) in a fuel tank (not shown) to supply the hydrogen to the fuel cell 10. The pressure sensor 5 detects the pressure of the hydrogen supplied to the fuel cell 10 to output the detected pressure to the system controlling device 20 as a signal S5.

The fuel cell 10 is formed by layering the fuel cells, each of which are formed by attaching electrodes having a structure such as a porous layer capable of diffusing the gas to both surfaces of an electrolyte film (not shown), with conductive separators sandwiched between the fuel cells. The outputted voltage corresponding to the number of layers can be extracted from the fuel cell 10. Specifically, the fuel cell 10 includes cathode and anode electrodes (not shown) on the surfaces of the electrolyte film. The air is supplied to the cathode electrode from the air supplying device 1, and the hydrogen is supplied to the anode electrode from the hydrogen supplying device 2. The fuel cell 10 generates the power by using a chemical reaction between the air and the hydrogen thus supplied. Various kinds of controls are executed to the fuel cell 10 by a control signal S10 supplied from the system controlling device 20.

The radiator 6 has a function of externally radiating the heat of the cooling water circulating in the fuel cell 10. The three-way valve 7 makes it possible to choose whether to supply the cooling water having passed through the fuel cell 10 to the radiator 6 or to supply it not to the radiator 6 but to the fuel cell 10. Opening-shutting switching of three-way valve 7 is controlled by a signal S7 supplied from the system controlling device 20. The cooling water pump 8, which circulates the cooling water into the fuel cell 10, is controlled by a signal S8 supplied from the system controlling device 20.

The temperature sensor 9 detects the temperature of the cooling water having passed through the fuel cell 10 to output the detected temperature to the system controlling device 20 as a signal S9. The temperature detected by the temperature sensor 9 substantially corresponds to the temperature of the fuel cell 10. The control of the three-way valve 7 by the above-mentioned system controlling device 20 is executed mainly based on the temperature detected by the temperature sensor 9. For example, when the temperature detected by the temperature sensor 9 is high, since the temperature of the fuel cell 10 is high, the system controlling device 20 controls the three-way valve 7 so that the cooling water passes through the radiator 6. Meanwhile, when the temperature detected by the temperature sensor 9 is low, since the temperature of the fuel cell 10 is low, the system controlling device 20 controls the three-way valve 7 so that the cooling water does not pass through the radiator 6.

The inverter 12 obtains the electric current generated by the fuel cell 10 to supply the electric current corresponding to a signal S12 supplied from the system controlling device 20 to the driving motor 13. The driving motor 13 drives wheels of the vehicle based on the supplied current. The converter 14 obtains the electric current generated by the fuel cell 10 or the electric current supplied from the battery 15 and converts the obtained current into a direct current to output it. The battery 15 charges the electric current supplied from the converter 14 and outputs the charged electric current to the converter 14. By obtaining a signal S15 from the battery 15, the system controlling device 20 detects the remaining chargeable amount (hereinafter simply referred to as "chargeable amount"). The chargeable amount corresponds to difference between the entire capacity of the battery 15 (the capacity in case that the charge amount is 0) and the present charge amount of the battery 15.

The system controlling device 20 is constructed by the so-called ECU (Electric Control Unit) and includes a CPU, a ROM, a RAM, an A/D converter and an input/output interface. As described above, the system controlling device 20 executes control of components in the fuel cell system based on output from various kinds of sensors. The control executed by the system controlling device 20 will be explained in detail later.
(Configuration of System Controlling Device)
Next, a description will be given of the concrete configuration of the system controlling device 20 with reference to FIG. 2.

Figure 2:
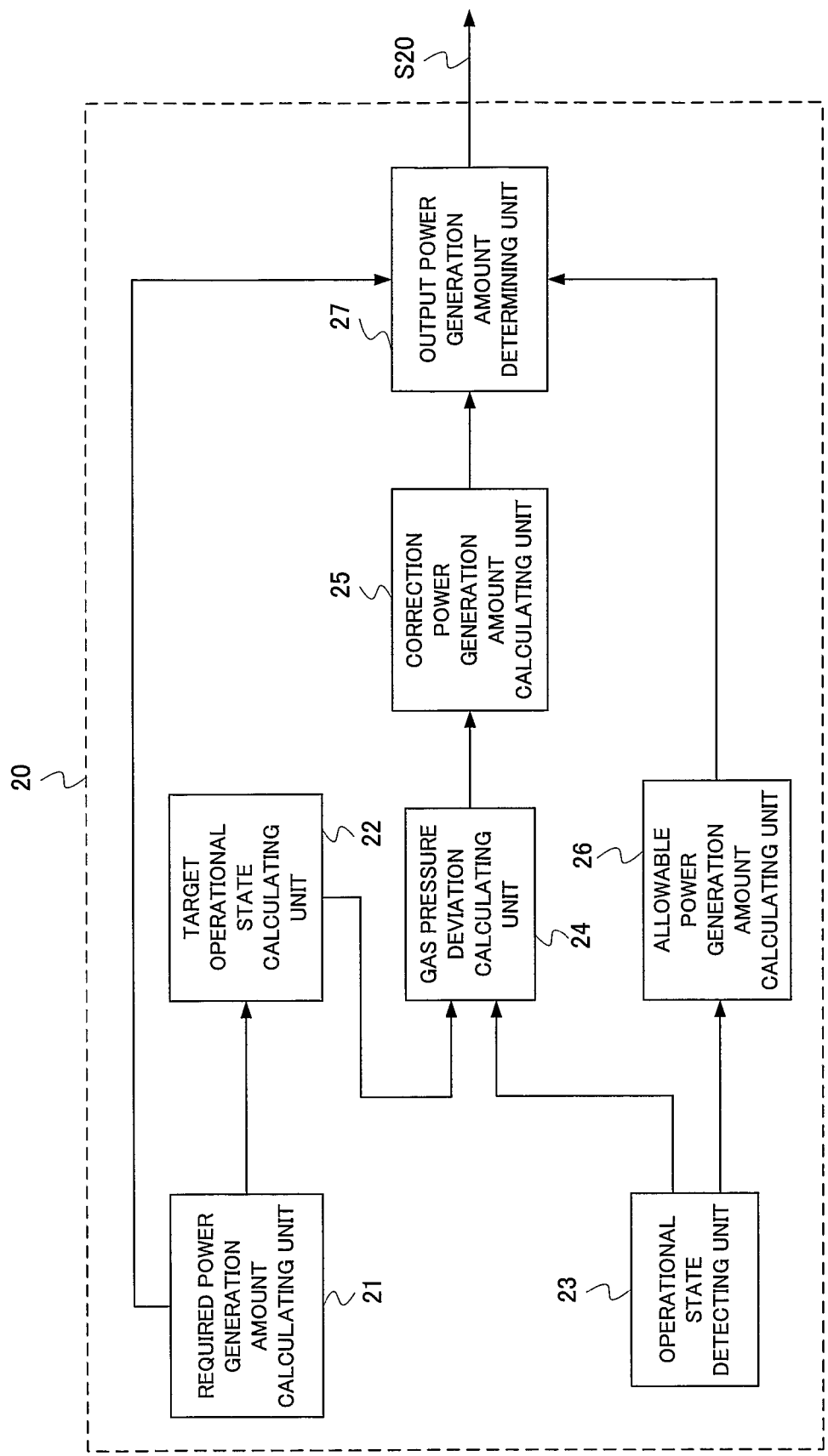
FIG. 2 is a block diagram schematically showing a configuration of a system controlling device according to the first embodiment.

FIG. 2 is a block diagram schematically showing the configuration of the system controlling device 20. The system controlling device 20 includes a required power generation amount calculating unit 21, a target operational state calculating unit 22, an operational state detecting unit 23, a gas pressure deviation calculating unit 24, a correction power generation amount calculating unit 25, an allowable power generation amount calculating unit 26 and an output power generation amount determining unit 27.

The required power generation amount calculating unit 21 calculates the required power generation amount generated by the fuel cell 10 based on operation by a driver. For example, the required power generation amount calculating unit 21 obtains the opening degree of the accelerator operated by the driver to calculate the required power generation amount. The required power generation amount calculating unit 21 supplies the calculated required power generation amount to the target operational state calculating unit 22 and the output power generation amount determining unit 27. The required power generation amount can be expressed by the electric current.

The target operational state calculating unit 22 calculates the target operational state corresponding to the required power generation amount calculated in the required power generation amount calculating unit 21. Concretely, the target operational state calculating unit 22 calculates a target value of the gas amount (gas flow amount) of the air and the hydrogen supplied to the fuel cell 10 and a target value of the gas pressure of the air and the hydrogen as the target operational state. Then, the target operational state calculating unit 22 supplies the calculated target operational state to the gas pressure deviation calculating unit 24.

The operational state detecting unit 23 obtains the operational state of the fuel cell 10 in a case that the fuel cell 10 is driven in accordance with the target operational state calculated in the target operational state calculating unit 22. Concretely, the operational state detecting unit 23 obtains, from the air flow meter 3 and the pressure sensors 4 and 5, the gas amount and the gas pressure of the air and the hydrogen supplied to the fuel cell 10. At the same time, the operational state detecting unit 23 obtains the temperature of the fuel cell 10 from the temperature sensor 9. Then, the operational state detecting unit 23 supplies the detected operational state to the gas pressure deviation calculating unit 24 and the allowable power generation amount calculating unit 26.

The gas pressure deviation calculating unit 24 obtains the target operational state supplied from the target operational state calculating unit 22 and the operational state of the fuel cell 10 supplied from the operational state detecting unit 23. Concretely, the gas pressure deviation calculating unit 24 obtains the operational state as the gas pressure. Then, the gas pressure deviation calculating unit 24 calculates the deviation (hereinafter also referred to as "gas pressure deviation") between the gas pressure corresponding to the target operational state and the gas pressure corresponding to the operational state of the fuel cell 10. The gas pressure deviation calculating unit 24 supplies the calculated gas pressure deviation to the correction power generation amount calculating unit 25.

The correction power generation amount calculating unit 25 calculates the correction power generation amount used for correcting the required power generation amount based on the gas pressure deviation calculated by the gas pressure deviation calculating unit 24. The correction power generation amount is used for correcting (decompressing) the gas pressure of the hydrogen in accordance with the gas pressure deviation. Concretely, the correction power generation amount calculating unit 25 calculates the correction power generation amount based on a map showing the relation between the gas pressure deviation and the correction power generation amount. The correction power generation amount can be expressed by the electric current.

Figure 3:
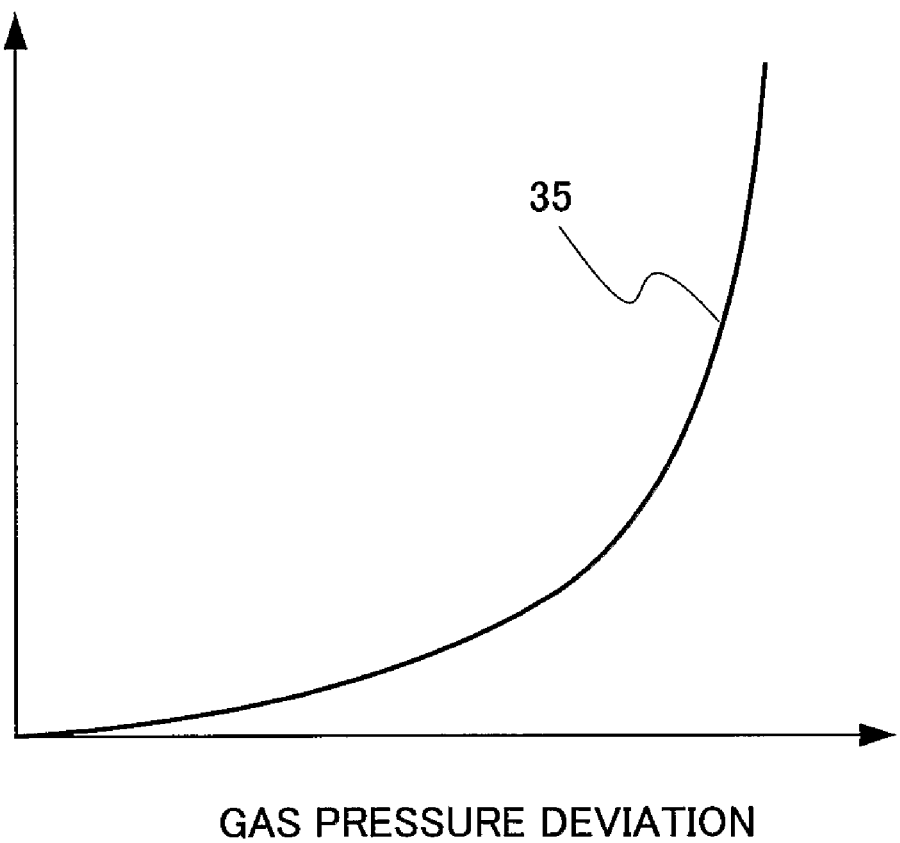
FIG. 3 is a diagram showing an example of a map used for calculating correction power generation amount.

FIG. 3 shows an example of the map used for calculating the correction power generation amount. In FIG. 3, a horizontal axis shows the gas pressure deviation, and a vertical axis shows the correction power generation amount. The correction power generation amount calculating unit 25 determines the correction power generation amount from the gas pressure deviation based on a curved line shown by a reference numeral 35 in FIG. 3. By the curved line shown by the reference numeral 35, it is understood that the variation amount of the correction power generation amount with respect to the variation of the gas pressure deviation is large when the gas pressure deviation is large. Therefore, when the gas pressure deviation is large, the gain of the feedback according to the control in the operational state becomes large. As the gas pressure deviation becomes larger, the degree of correcting the required power generation amount can be large, and thus the fuel cell system can hasten the speed of converging the operational state in the target operational state. Meanwhile, by the curved line shown by the reference numeral 35, it is understood that the variation amount of the correction power generation amount with respect to the variation of the gas pressure deviation is small when the gas pressure deviation is small. Therefore, when the gas pressure deviation is small, the gain of the feedback according to the control of the operational state becomes small. Thus, when the detected operational state becomes close to the target operational state, the correction can be performed precisely, and thus the convergent property in the target operational state can be high. Thereby, it can be prevented that excessive decompression (overshooting/undershooting) to the target gas pressure occurs, for example. The correction power generation amount thus calculated is supplied to the output power generation amount determining unit 27.

Returning to FIG. 2, the allowable power generation amount calculating unit 26 will be explained. The allowable power generation amount calculating unit 26 obtains the operational state of the fuel cell 10 from the operational state detecting unit 23 to calculate the allowable power generation amount which the fuel cell 10 can stably generate on the basis of the obtained operational state. For example, the allowable power generation amount calculating unit 26 obtains the gas pressure and the gas amount of the hydrogen or the air or the temperature of the fuel cell 10 as the operational state of the fuel cell 10. Concretely, the allowable power generation amount calculating unit 26 calculates the allowable power generation amount based on the map showing the relation between the operational state of the fuel cell 10 and the allowable power generation amount. The allowable power generation amount can be expressed by the electric current.

Figure 4A:
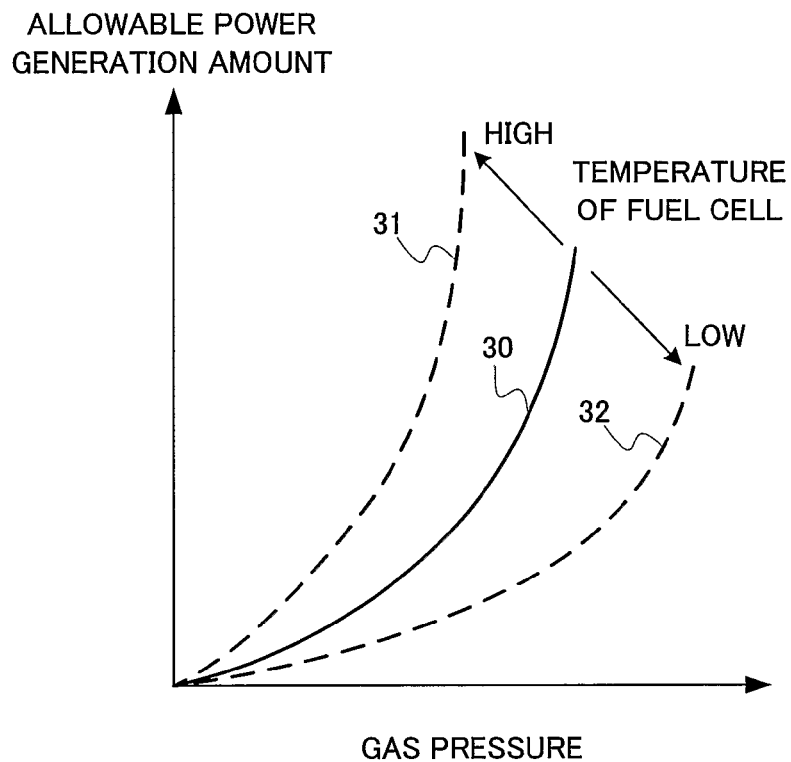
FIGS. 4A and 4B are diagrams showing examples of maps used for calculating allowable power generation amount.
Figure 4B:
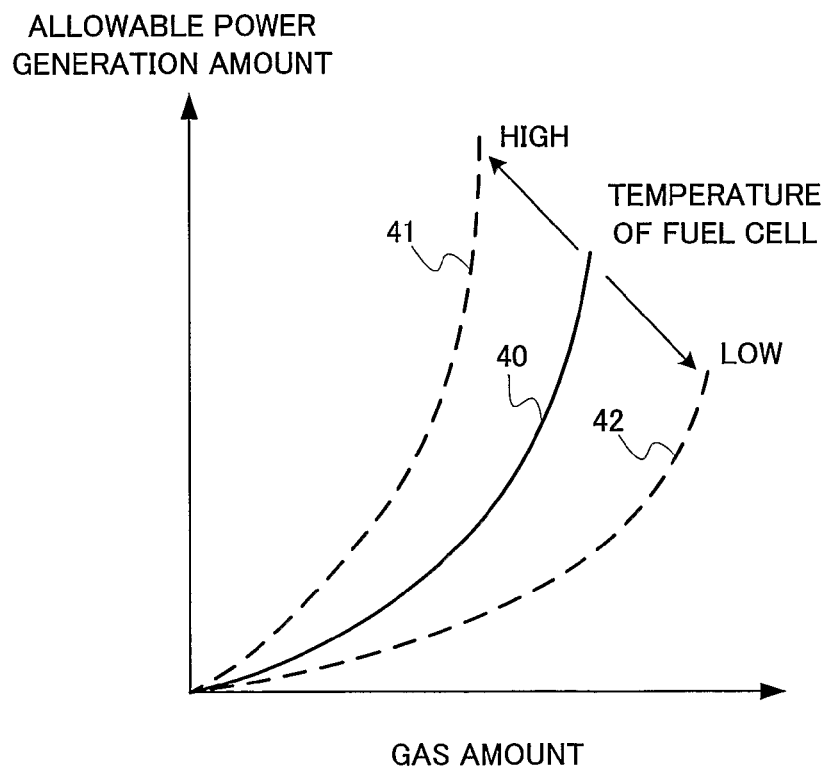

FIGS. 4A and 4B show examples of a map used for calculating the allowable power generation amount. The allowable power generation amount calculating unit 26 uses a map shown in FIG. 4A when the gas pressure is used as the operational state of the fuel cell 10, and uses a map shown in FIG. 4B when the gas amount is used as the operational state of the fuel cell 10.

In FIG. 4A, a horizontal axis shows the gas pressure and a vertical axis shows the allowable power generation amount. The allowable power generation amount calculating unit 26 determines the allowable power generation amount based on a curved line shown by a reference numeral 30. Concretely, as the gas pressure becomes larger, the allowable power generation amount calculating unit 26 determines the larger value as the allowable power generation amount. Further, the allowable power generation amount calculating unit 26 changes the map used for calculating the allowable power generation amount based on the temperature of the fuel cell 10. Concretely, the allowable power generation amount calculating unit 26 uses a curved line shown by a reference numeral 31 when the temperature of the fuel cell 10 is high, and uses a curved line shown by a reference numeral 32 when the temperature of the fuel cell 10 is low. Namely, the allowable power generation amount calculating unit 26 uses the map having a large variation rate of the allowable power generation amount with respect to the variation of the gas pressure when the temperature of the fuel cell 10 is high. Conversely, the allowable power generation amount calculating unit 26 uses the map having a small variation rate of the allowable power generation amount with respect to the variation of the gas pressure when the temperature of the fuel cell 10 is low.

In FIG. 4B, a horizontal axis shows the gas amount, and a vertical axis shows the allowable power generation amount. The allowable power generation amount calculating unit 26 determines the allowable power generation amount based on a curved line shown by a reference numeral 40. Concretely, as the gas amount becomes larger, the allowable power generation amount calculating unit 26 determines the larger value as the allowable power generation amount. Further, the allowable power generation amount calculating unit 26 obtains the temperature of the fuel cell 10 from the temperature sensor 9 to change the map used for calculating the allowable power generation amount based on the temperature of the fuel cell 10. Concretely, the allowable power generation amount calculating unit 26 uses a curved line shown by a reference numeral 41 when the temperature of the fuel cell 10 is high, and uses a curved line shown by a reference numeral 42 when the temperature of the fuel cell 10 is low. Concretely, the allowable power generation amount calculating unit 26 uses the map having the large variation rate of the allowable power generation amount with respect to the variation of the gas amount when the temperature of the fuel cell 10 is high. Conversely, the allowable power generation amount calculating unit 26 uses the map having the small variation rate of the allowable power generation amount with respect to the variation of the gas amount when the temperature of the fuel cell 10 is low.

The allowable power generation amount thus determined is supplied to the output power generation amount determining unit 27.

Returning to FIG. 2, the output power generation amount determining unit 27 will be explained. The output power generation amount determining unit 27 obtains the required power generation amount supplied from the required power generation amount calculating unit 21, the correction power generation amount supplied from the correction power generation amount calculating unit 25 and the allowable power generation amount supplied from the allowable power generation amount calculating unit 26. Based on the obtained power generation amounts, the output power generation amount determining unit 27 determines the power generation amount (output power generation amount) finally outputted from the fuel cell 10. The output power generation amount shows the power generation current, too.

Concretely, the output power generation amount determining unit 27 compares the power generation amount obtained by correcting the required power generation amount by the correction power generation amount with the allowable power generation amount, thereby to determine the output power generation amount. More specifically, the output power generation amount determining unit 27 compares the allowable power generation amount and the sum of the required power generation amount and the correction power generation amount to determine the output power generation amount. In this case, the output power generation amount determining unit 27 determines the allowable power generation amount as the output power generation amount when the sum of the required power generation amount and the correction power generation amount is equal to or larger than the allowable power generation amount. Conversely, the output power generation amount determining unit 27 determines the sum of the required power generation amount and the correction power generation amount as the output power generation amount when the sum of the required power generation amount and the correction power generation amount is smaller than the allowable power generation amount. The output power generation amount thus determined is supplied to each of the controlling units in the fuel cell system as a signal S20.

(Output Power Generation Amount Determining Process)

Figure 5:
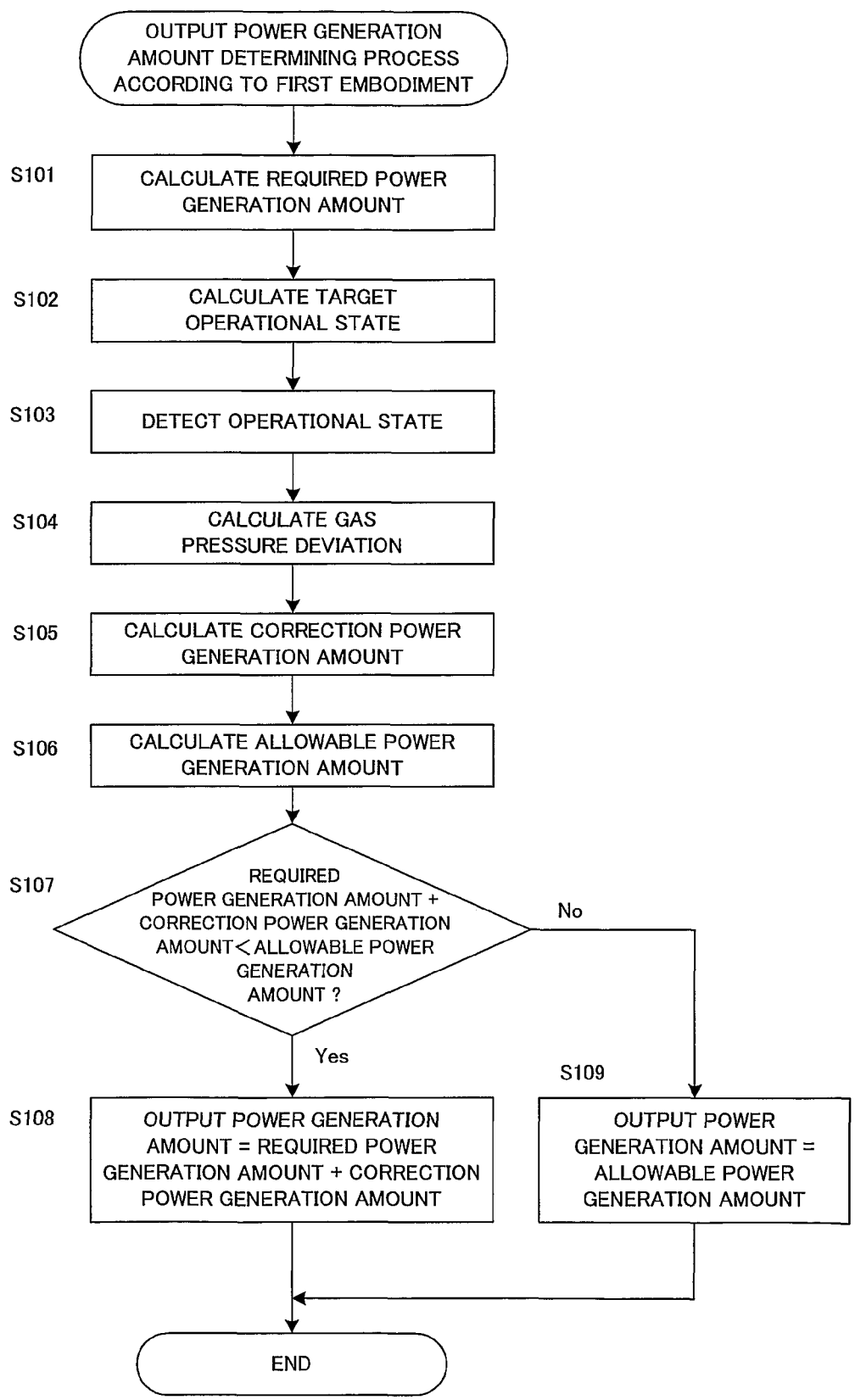
FIG. 5 is a flow chart showing an output power generation amount determining process according to the first embodiment.

Next, a description will be given of an output power generation amount determining process executed in the system controlling device 20 with reference to a flow chart shown in FIG. 5. This output power generation amount determining process determines the output power generation amount finally outputted from the fuel cell 10. The output power generation amount determining process is repeatedly executed with a predetermined period.

First, in step S101, the required power generation amount calculating unit 21 in the system controlling device 20 calculates the required power generation amount based on the operation of the driver. Then, the process goes to step S102. In step S102, the target operational state calculating unit 22 calculates the target operational state corresponding to the required power generation amount. For example, the target operational state calculating unit 22 calculates the target gas pressure of the hydrogen. Next, the process goes to step S103.

In step S103, the operational state detecting unit 23 detects the present operational state of the fuel cell 10. In this case, the operational state detected by the operational state detecting unit 23 corresponds to the operational state of the fuel cell 10 in a case that the control is executed based on the target operational state calculated in the target operational state calculating unit 22. For example, the operational state detecting unit 23 obtains the gas pressure of the hydrogen from the pressure sensor 5. Then, the process goes to step S104.

In step S104, the gas pressure deviation calculating unit 24 calculates the deviation between the target operational state calculated in the target operational state calculating unit 22 and the operational state of the fuel cell 10 detected in the operational state detecting unit 23. Concretely, the gas pressure deviation calculating unit 24 obtains the operational state as the gas pressure to calculate the gas pressure deviation. Then, the process goes to step S105.

In step S105, the correction power generation amount calculating unit 25 calculates the correction power generation amount for correcting the required power generation based on the gas pressure deviation calculated in the gas pressure deviation calculating unit 24. Concretely, the correction power generation amount calculating unit 25 calculates the correction power generation amount based on the map shown in FIG. 3. Then, the process goes to step S106.

In step S106, based on the present operational state of the fuel cell 10, the allowable power generation amount calculating unit 26 calculates the allowable power generation amount which the fuel cell 10 can stably generate. Concretely, based on the gas pressure and the gas amount of the hydrogen or the oxygen and the temperature of the fuel cell 10, the allowable power generation amount calculating unit 26 calculates the allowable power generation amount by using the map shown in FIGS. 4A and 4B. The process goes to step S107.

In step S107, the output power generation amount determining unit 27 compares the allowable power generation amount with the sum of the required power generation amount and the correction power generation amount. Concretely, the output power generation amount determining unit 27 determines whether or not the sum of the required power generation amount and the correction power generation amount is smaller than the allowable power generation amount. When the sum of the required power generation amount and the correction power generation amount is smaller than the allowable power generation amount (step S107; Yes), the process goes to step S108. Meanwhile, when the sum of the required power generation amount and the correction power generation amount is equal to or larger than the allowable power generation amount (step S107; No), the process goes to step S109.

In step S108, the output power generation amount determining unit 27 determines the sum of the required power generation amount and the correction power generation amount as the output power generation amount. This is because, in this case, the sum of the required power generation amount and the correction power generation amount is smaller than the allowable power generation amount and the power generation amount of the fuel cell 10 does not have to be limited by the allowable power generation amount. Therefore, the output power generation amount determining unit 27 determines, as the output power generation amount, the power generation amount obtained by correcting the required power generation amount by the correction power generation amount. When the above-mentioned process ends, the process goes out of the flow.

On the other hand, in step S109, the output power generation amount determining unit 27 determines the allowable power generation amount as the output power-generation amount. This is because, in this case, the sum of the required power generation amount and the correction power generation amount is equal to or larger than the allowable power generation amount and the output power generation amount of the fuel cell 10 has to be limited by the allowable power generation amount. Namely, it is necessary that the power generation amount equal to or larger than the allowable power generation amount is not outputted from the fuel cell 10. Therefore, the output power generation amount determining unit 27 determines the allowable power generation amount as the output power generation amount without using the power generation amount obtained by correcting the required power generation amount by the correction power generation amount. When the above-mentioned process ends, the process goes out of the flow.

In this manner, in the fuel cell system according to the first embodiment, the allowable power generation amount is calculated based on the present operational state of the fuel cell 10. The required power generation amount is limited by this allowable power generation amount, and the output power generation amount is determined. Thus, the fuel cell system can obtain the power generation amount from the fuel cell 10 within the range of the allowable power generation amount corresponding to the operational state. Thereby, when the required power generation amount is decreased from the high load to the low load, since the output power generation amount of the fuel cell 10 is limited by the allowable power generation amount, it becomes possible to appropriately decompress the hydrogen gas pressure. More specifically, when the required power generation amount changes from the high load to the low load, by executing the process of increasing the power generation amount for consuming the hydrogen in an early stage, the deterioration of the fuel cell 10 due to the gas insufficiency and the instability of the cell voltage may occur. However, in the fuel cell system according to the first embodiment, since the output power generation amount is limited by the allowable power generation amount, occurrence of such a problem can be prevented.

Second Embodiment

Next, a description will be given of a second embodiment of the present invention.

The fuel cell system according to the second embodiment is different from the fuel cell system according to the first embodiment in that the feedback control for setting the operational state to the target operational state is not executed when the required power generation amount is equal to or larger than the predetermined value. Specifically, in the second embodiment, only when the required power generation amount is smaller than the predetermined value, the required power generation amount is corrected by the correction power generation amount. Meanwhile, when the required power generation amount is equal to or larger than the predetermined value, the required power generation amount is not corrected (i.e., the correction power generation amount is set to "0"). The reason is below. When the required power generation amount is equal to or larger than the predetermined value, e.g., the vehicle changes to the accelerating state again from the decelerating state, the sufficient hydrogen gas pressure is kept with respect to the required power generation amount. Thus, it is preferable that the required power generation amount is determined as the output power generation amount without being corrected.

Figure 6:
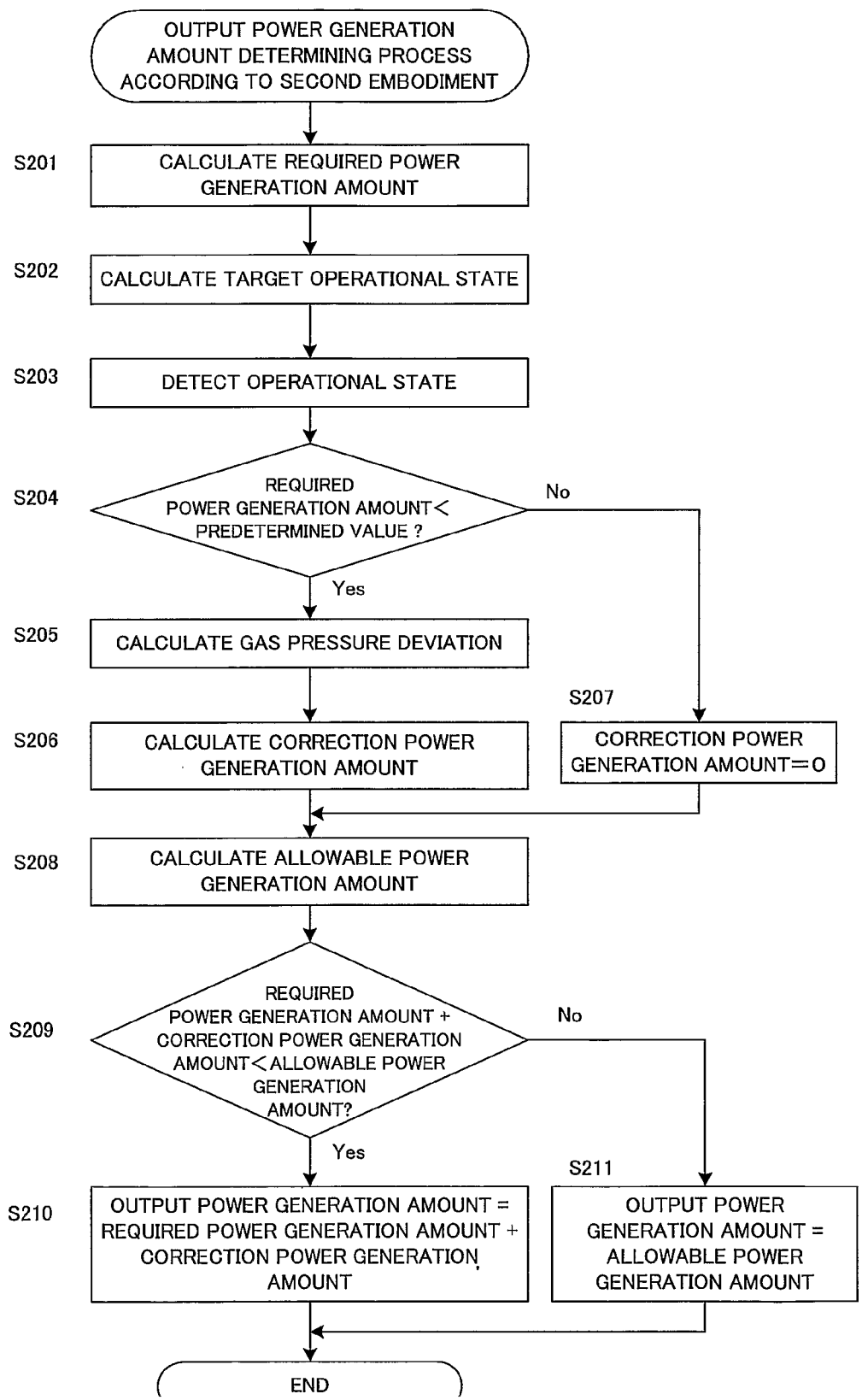
FIG. 6 is a flow chart showing an output power generation amount determining process according to a second embodiment.

Now, a description will be given of the output power generation amount determining process according to the second embodiment with reference to a flow chart shown in FIG. 6. The fuel cell system and the system controlling device executing the output power generating amount determining process according to the second embodiment have the same configurations as those of the fuel cell system shown in FIG. 1 and the system controlling device 20 shown in FIG. 2. In addition, the output power generation amount determining process according to the second embodiment is repeatedly executed with the predetermined period.

In step S201, the required power generation amount calculating unit 21 calculates the required power generation amount based on the operation of the driver, and the process goes to step S202. In step S202, the target operational state calculating unit 22 calculates the target operational state corresponding to the required power generation amount, and the process goes to step S203. In step S203, the operational state detecting unit 23 detects the present operational state of the fuel cell 10, and the process goes to step S204. In this manner, the processes in steps S201 to S203 are same as the processes in steps S101 to S103 of the output power generation amount determining process according to the first embodiment.

In step S204, it is determined whether or not the required power generation amount is smaller than the predetermined value. For example, as the predetermined value used for the determination in step S204, a value in the substantial vicinity of a border between the high load and the low load can be used. When the required power generation amount is smaller than the predetermined value (step S204; Yes), the process goes to step S205. Meanwhile, when the required power generation amount is equal to or larger than the predetermined value (step S204; No), the process goes to step S207.

When the required power generation amount is smaller than the predetermined value (step S204; Yes), the vehicle is in the decelerating state and has low load. Thus, the same processes as above-mentioned steps S104 and S105 are executed, and the correction power generation amount is calculated. Concretely, in step S205, the gas pressure deviation calculating unit 24 calculates the deviation between the target operational state and the operational state of the fuel cell 10, and the process goes to step S206. In step S206, the correction power generation amount calculating unit 25 calculates the correction power generation amount based on the gas pressure deviation calculated in the gas pressure deviation calculating unit 24. Then, the process goes to step S208.

On the other hand, when the required power generation amount is equal to or larger than the predetermined value (step S204; No), the process in step S207 is executed. In step S207, the correction power generation amount calculating unit 25 outputs "0" as the correction power generation amount. In this case, since the required power generation amount is equal to or larger than the predetermined value, the load is not low, and the vehicle is in the accelerating state. Thus, since such probability that the sufficient hydrogen gas pressure is kept with respect to the required power generation amount is high, the required power generation amount is not corrected. When the above-mentioned process ends, the process goes to step S208.

In step S208, similarly to the above-mentioned process in step S106, the allowable power generation amount calculating unit 26 calculates the allowable power generation amount based on the operational state of the fuel cell 10. Then, the process goes to step S209. In step S209, the output power generation amount determining unit 27 determines whether or not the sum of the required power generation amount and the correction power generation amount is smaller than the allowable power generation amount, similarly to the above-mentioned process in step S107. When the sum of the required power generation amount and the correction power generation amount is smaller than the allowable power generation amount (step S209; Yes), the process goes to step S210. When the sum of the required power generation amount and the correction power generation amount is equal to or larger than the allowable power generation amount (step S209; No), the process goes to step S211. When the correction power generation amount is "0" (i.e., when the process in step S207 is executed), the required power generation amount and the allowable power generation amount are compared with each other.

Similarly to the above-mentioned process in step S108, in step S210, the output power generation amount determining unit 27 determines the sum of the required power generation amount and the correction power generation amount as the output power generation amount. In this case, since the sum of the required power generation amount and the correction power generation amount is smaller than the allowable power generation amount, the output power generation amount determining unit 27 determines, as the output power generation amount, the power generation amount obtained by correcting the required power generation amount by the correction power generation amount. When the correction power generation amount is "0", the required power generation amount is determined as the output power generation amount. When the above-mentioned process ends, the process goes out of the flow.

On the other hand, in step S211, similarly to the above-mentioned process in step S109, the output power generation amount determining unit 27 determines the allowable power generation amount as the output power generation amount. In this case, since the sum of the required power generation amount and the correction power generation is equal to or larger than the allowable power generation amount, the output power generation amount determining unit 27 determines the allowable power generation amount as the output power generation amount. When the above-mentioned process ends, the process goes out of the flow.

As described above, according to the fuel cell system of the second embodiment, whether or not to correct the required power generation amount is determined in accordance with the required power generation amount, i.e., in accordance with the load in the fuel cell 10, and the output power generation amount of the fuel cell 10 is determined. Thereby, when the required power generation amount is equal to or larger than the predetermined value, e.g., the vehicle is in the accelerating state again from the decelerating state, by using the hydrogen gas pressure sufficiently kept with respect to the required power generation amount, the necessary required power generation amount can be determined as the output power generation amount. Conversely, when the required power generation amount is smaller than the predetermined value, by using the excessive air generated due to decreasing of the air gas flow amount, the useless consumption of the energy can be prevented. Concretely, the excessive air occurs due to response delay of an air compressor and minimum air flow amount of the air compressor. However, by using the excessive air, the energy for driving the air compressor can be reduced.

Third Embodiment

Next, a third embodiment of the present invention will be explained.

The fuel cell system according to the third embodiment is different from the above-mentioned fuel cell systems according to the first and second embodiments in that the output power generation amount of the fuel cell 10 is determined in view of the chargeable amount of the battery 15. Concretely, in the third embodiment, the output power generation amount is limited by the allowable power generation amount of the fuel cell 10 and the chargeable amount of the battery 15. This is executed so that the excessive charge to the battery 15 is suppressed and the deterioration of the battery 15 is prevented. At the same time, this is executed so that the power generation current is charged into the battery 15 and energy efficiency is improved.

Figure 7:
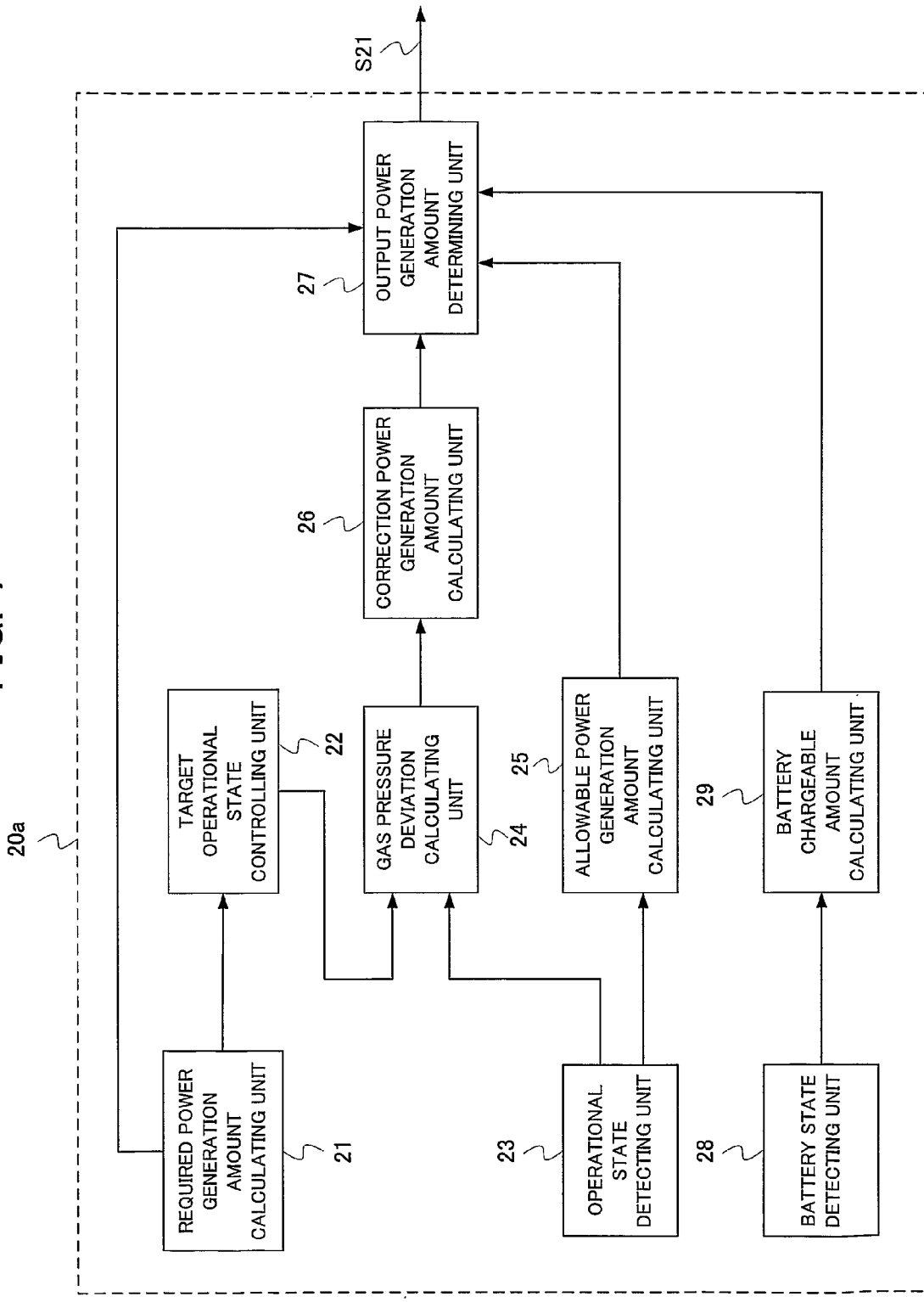
FIG. 7 is a block diagram schematically showing a configuration of a system controlling device according to a third embodiment.

FIG. 7 is a block diagram schematically showing a configuration of a system controlling device 20a of the fuel cell system according to the third embodiment. The system controlling device 20a is different from the above-mentioned system controlling device 20 in that it includes the battery state detecting unit 28 and the battery chargeable amount calculating unit 29. Thus, the same reference numerals are given to the same components as those of the system controlling device 20, and explanations thereof will be omitted.

The battery state detecting unit 28 detects the charge state of the battery 15 based on the signal S15 obtained from the battery 15. The battery state detecting unit 28 then supplies the detected charge state of the battery 15 to the battery chargeable amount calculating unit 29.

The battery chargeable amount calculating unit 29 calculates the chargeable amount of the battery 15. Concretely, the battery chargeable amount calculating unit 29 calculates the difference between the entire storage capacity of the battery 15 and the charge state of the battery 15 supplied from the battery state detecting unit 28 to calculate the chargeable amount of the battery 15. Then, the battery chargeable amount calculating unit 29 supplies the chargeable amount of the calculated battery 15 to the output power generation amount determining unit 27. In this manner, the battery chargeable amount calculating unit 29 functions as the storage device chargeable amount calculating unit. The chargeable amount can be expressed by the electric current.

The output power generation amount determining unit 27 determines the output power generation amount of the fuel current 10 based on the relation among the sum of the required power generation amount and the correction power generation amount, the allowable power generation amount, and the sum of the required power generation amount and the chargeable amount. Concretely, the output power generation amount determining unit 27 determines the power generation amount having the smallest value among the above-mentioned three power generation amounts as the output power generation amount. The output power generation amount thus determined is supplied to each of the controlling units of the fuel cell system as a signal S21.

Figure 8:
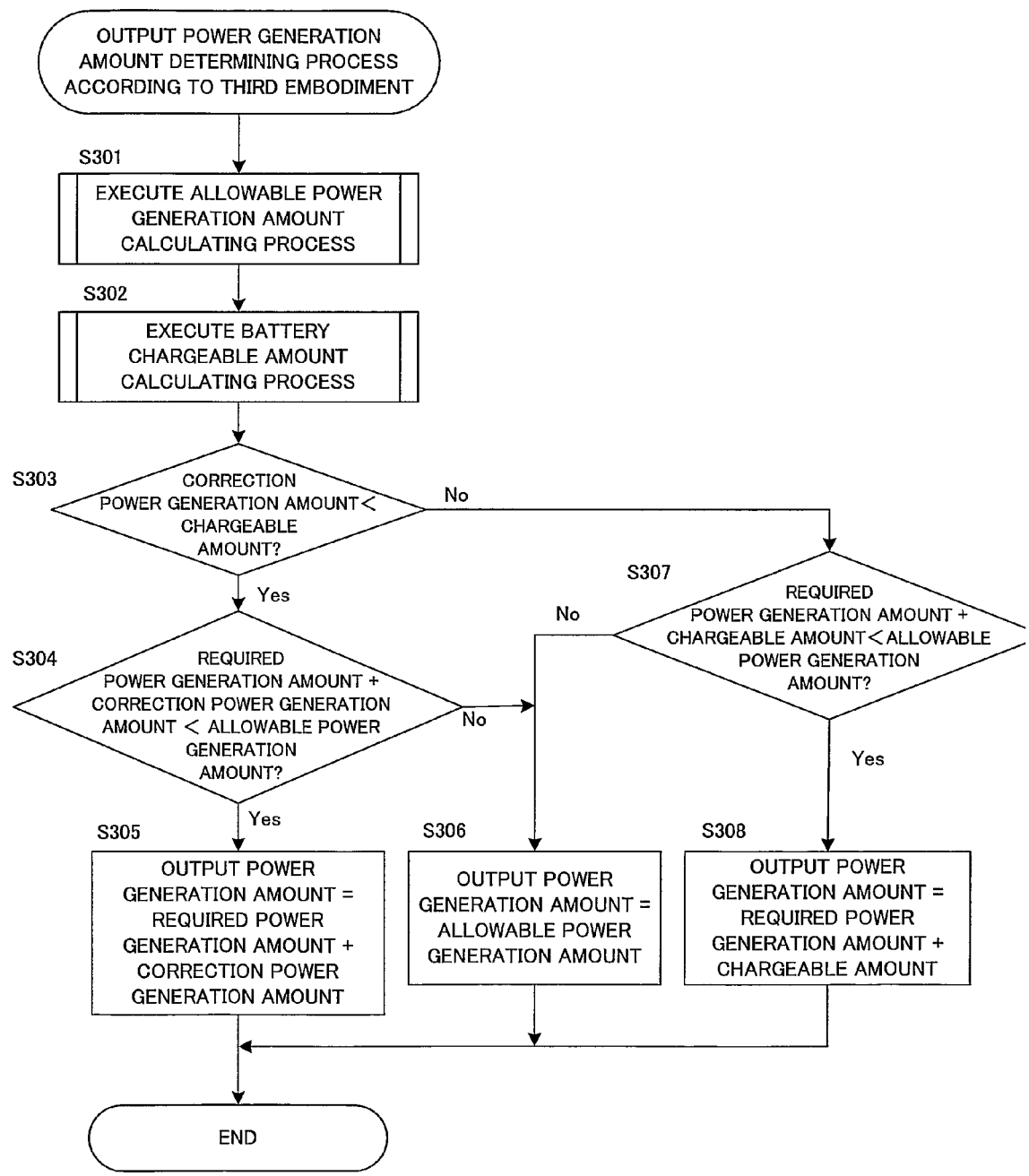
FIG. 8 is a flow chart showing an output power generation amount determining process according to the third embodiment.

Next, a description will be given of the output power generation amount determining process according to the third embodiment with reference to a flow chart shown in FIG. 8. The output power generation amount determining process according to the third embodiment is repeatedly executed with the predetermined period.

First, in step S301, the allowable power generation amount calculating process for calculating the allowable power generation amount is executed. In this allowable power generation amount calculating process, the processes in steps S101 to S106 in the first embodiment shown in FIG. 5 or the processes in steps S201 to S208 in the second embodiment shown in FIG. 6 are executed. Namely, by executing the allowable power generation amount calculating process, not only the allowable power generation amount but also the required power generation amount and the correction power generation amount are calculated. When the above-mentioned processes end, the process goes to step S302.

Figure 9:
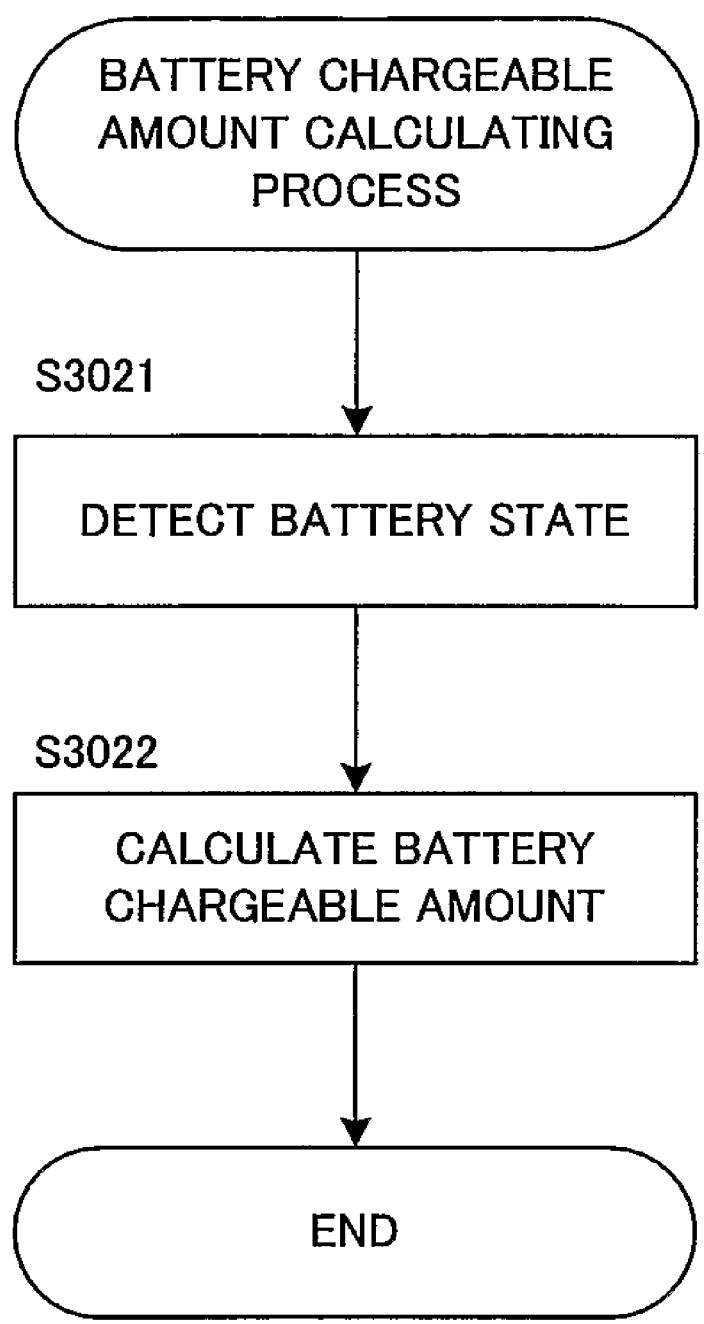
FIG. 9 is a flow chart showing a battery chargeable amount calculating process.

In step S302, the battery chargeable amount calculating process is executed. FIG. 9 shows a flow chart of the battery chargeable amount calculating process. First, in step S3021, the battery state detecting unit 28 detects the charge state of the battery 15 based on the signal S15 obtained from the battery 15. Then, the process goes to step S3022. In step S3022, the battery chargeable amount calculating unit 29 calculates the difference between the entire storage capacity of the battery 15 and the charge state of the battery 15 to calculate the chargeable amount of the battery 15. Then, the process goes out of the flow to go to step S303 in the main routine.

Returning to FIG. 8, the process of step S303 will be explained. In step S303, the output power generation amount determining unit 27 determines whether or not the correction power generation amount is smaller than the chargeable amount of the battery 15. When the correction power generation amount is smaller than the chargeable amount (step S303; Yes), the process goes to step S304. When the correction power generation amount is equal to or larger than the chargeable amount (step S303; No), the process goes to step S307.

In step S304, the output power generation amount determining unit 27 determines whether or not the sum of the required power generation amount and the correction power generation amount is smaller than the allowable power generation amount. When the sum of the required power generation amount and the correction power generation amount is smaller than the allowable power generation amount (step S304; Yes), the process goes to step S305. When the sum of the required power generation amount and the correction power generation amount is smaller than the allowable power generation amount (step S304; No), the process goes to step S306.

In step S305, the output power generation amount determining unit 27 determines the sum of the required power generation amount and the correction power generation amount as the output power generation amount. Since the sum of the required power generation amount and the correction power generation amount is smallest in the sum of the required power generation amount and the correction power generation amount, the allowable power generation amount and the sum of the required power generation amount and the chargeable amount, such determination is performed. Thus, in this case, the output power generation amount does not have to be limited by the allowable power generation amount and the chargeable amount. When the above-mentioned process ends, the process goes out of the flow.

In step S306, the output power generation amount determining unit 27 determines the allowable power generation amount as the output power generation amount. Since the allowable power generation amount is smallest in the sum of the required power generation amount and the correction power generation amount, the allowable power generation amount and the sum of the required power generation amount and the chargeable amount, such determination is performed. Namely, the output power generation amount determining unit 27 limits the output power generation amount by the allowable power generation amount. When the above-mentioned process ends, the process goes out of the flow.

On the other hand, in step S307, the output power generation amount determining unit 27 determines whether or not the sum of the required power generation amount and the chargeable amount is smaller than the allowable power generation amount. When the sum of the required power generation amount and the chargeable amount is smaller than the allowable power generation amount (step S307; Yes), the process goes to step S308.

In step S308, the output power generation determining unit 27 determines the sum of the required power generation amount and the chargeable amount as the output power generation amount. Since the sum of the required power generation amount and the chargeable amount is smallest in the sum of the required power generation amount and the correction power generation amount, the allowable power generation amount and the sum of the required power generation amount and the chargeable amount, such determination is performed. Thus, the output power generation amount determining unit 27 limits the output power generation amount by the chargeable amount of the battery 15. In this manner, the power of the fuel cell 10 is generated by the output power generation amount expressed by using the chargeable amount, and thereby the deterioration of the battery 15 can be prevented. At the same time, accessories in the vehicle are driven by using the charge currency of the battery 15, and thereby the correction power generation amount can be maintained. When the above-mentioned process ends, the process goes out of the flow.

Conversely, when the sum of the required power generation amount and the chargeable amount is equal to or larger than the allowable power generation amount (step S307; No), the process goes to step S306. In this case, in step S306, the output power generation amount determining unit 27 determines the allowable power generation amount as the output power generation amount. Since the allowable power generation amount is smallest in the sum of the required power generation amount and the correction power generation amount, the allowable power generation and the sum of the required power generation amount and the chargeable amount, such determination is performed. When the above-mentioned process ends, the process goes out of the flow.

In this manner, in the fuel cell system according to the third embodiment, the output power generation amount is determined based on not only the allowable power generation amount of the fuel cell 10 but also the chargeable amount of the battery 15. Thereby, it becomes possible that the excessive current charge to the battery 15 is suppressed and the deterioration of the battery 15 is prevented. In addition, even when the battery 15 is substantially in the full charge state, the consumption of the power corresponding to the decompression can be performed by the accessory such as the air compressor and an electric heater. Therefore, the hydrogen discharged by a hydrogen discharging valve (purge valve) for the decompression can be reduced. Therefore, concentration of the hydrogen in the exhaust gas can be reduced. Meanwhile, when the chargeable amount is comparatively large, by charging the excessive power generated due to the decompression to the battery 15, energy can be recovered, and thereby the consumption of the energy necessary for traveling can be reduced.

In the above third embodiment, the output power generation amount is determined based on the allowable power generation amount of the fuel cell 10 and the chargeable amount of the battery 15. Instead, the output power generation amount can be determined in view of only the chargeable amount of the battery 15. In this case, the output power generation determining unit 27 determines the sum of the required power generation amount and the chargeable amount as the output power generation amount when the correction power generation amount is larger than the chargeable amount. Meanwhile, the output power generation amount determining unit 27 determines the sum of the required power generation amount and the correction power generation amount as the output power generation amount when the correction power generation amount is equal to or smaller than the chargeable amount. In this manner, by limiting the output power generation amount with the chargeable amount, the deterioration of the battery can be prevented.

In the above-mentioned embodiment, there is disclosed such an example that the feedback control is executed by using the map so that the operational state of the fuel cell 10 becomes close to the target operational state. However, as another example, the feedback control can be executed by PID control instead of the map. In this case, when the difference between the target value and the actual value is large, updating of an integral paragraph is inhibited. Thereby, the overshooting can be suppressed.

Additionally, in the present invention, it is not limited that the battery 15 is used as the storage device. Namely, instead of the battery 15, a capacitor can be used as the storage device.

INDUSTRIAL APPLICABILITY

This invention is applicable to a fuel cell system used for a movable body such as vehicle.

The invention claimed is:

1. A fuel cell system, comprising:
a system controlling device programmed to execute control of components of the fuel cell system, the system controlling device including:
a required power generation amount calculating unit which calculates a required power generation amount of a fuel cell;
a target operational state calculating unit which calculates a target operational state corresponding to the required power generation amount;
an operational state detecting unit which detects an operational state of the fuel cell;
a correction power generation amount calculating unit which calculates a correction power generation amount used for correcting the required power generation amount based on a deviation between the target operational state and the detected operational state;
an allowable power generation amount calculating unit which calculates an allowable power generation amount which the fuel cell can stably generate based on the detected operational state; and
an output power generation amount determining unit which determines an output power generation amount of the fuel cell based on a relation between the allowable power generation amount and a power generation amount obtained by correcting the required power generation amount by the correction power generation amount,
wherein the output power generation amount determining unit determines the allowable power generation amount as the output power generation amount when the power generation amount obtained by correcting the required power generation amount by the correction power generation amount is equal to or larger than the allowable power generation amount, and the output power generation amount determining unit determines the power generation amount obtained by correcting the required power generation amount as the output power generation amount when the power generation amount obtained by correcting the required power generation amount by the correction power generation amount is smaller than the allowable power generation amount.

2. The fuel cell system according to claim 1, wherein the system controlling device further includes a storage device chargeable amount calculating unit which calculates chargeable amount of a storage device, and
wherein the output power generation amount determining unit determines a sum of the required power generation amount and the chargeable amount as the output power generation amount when the correction power generation amount is equal to or larger than the chargeable amount and the sum of the required power generation amount and the chargeable amount is smaller than the allowable power generation amount.

3. The fuel cell system according to claim 1, wherein the correction power generation amount calculating unit calculates the correction power generation amount so that, as the deviation becomes larger, a degree of correcting the required power generation amount becomes larger.

4. The fuel cell system according to claim 1, wherein the correction power generation amount calculating unit sets the correction power generation amount to zero when the required power generation amount is equal to or larger than a predetermined value.

5. A fuel cell system, comprising:
a system controlling device programmed to execute control of components of the fuel cell system, the system controlling device including:
a required power generation amount calculating unit which calculates a required power generation amount of a fuel cell;
a target operational state calculating unit which calculates a target operational state corresponding to the required power generation amount;
an operational state detecting unit which detects an operational state of the fuel cell;
a correction power generation amount calculating unit which calculates a correction power generation amount used for correcting the required power generation amount based on a deviation between the target operational state and the detected operational state;
a storage device chargeable amount calculating unit which calculates a chargeable amount of a storage device; and an output power generation amount determining unit programmed to determine an output power generation amount of the fuel cell based on a relation between the chargeable amount and a power generation amount obtained by correcting the required power generation amount by the correction power generation amount, wherein the output power generation amount determining unit determines the chargeable amount as the output power generation amount when the power generation amount obtained by correcting the required power generation amount by the correction power generation amount is equal to or larger than the chargeable amount, and the output power generation amount determining unit determines the power generation amount obtained by correcting the required power generation amount as the output power generation amount when the power generation amount obtained by correcting the required power generation amount by the correction power generation amount is smaller than the chargeable amount.

6. The fuel cell system according to claim 1, wherein the target operational state calculating unit calculates a target value of a gas flow amount of air and hydrogen supplied to the fuel cell and a target value of gas pressure of the air and the hydrogen as the target operational state.

7. The fuel cell system according to claim 1, wherein the operational state detecting unit obtains a gas amount and a gas pressure of air and hydrogen supplied to the fuel cell.

8. The fuel cell system according to claim 1, wherein the system controlling device further includes a gas pressure deviation calculating unit that obtains the operational state as a gas pressure and then calculates a deviation between the gas pressure corresponding to the target operational state and the gas pressure corresponding to the operational state of the fuel cell, and supplies the deviation to the correction power generation amount calculating unit.

9. The fuel cell system according to claim 1, wherein the correction power generation amount calculating unit calculates the correction power generation amount based on a map showing a relation between a gas pressure deviation and the correction power generation amount.

10. The fuel cell system according to claim 1, wherein the allowable power generation amount calculating unit calculates the allowable power generation amount based on a map showing a relation between the operational state of the fuel cell and the allowable power generation amount.

11. The fuel cell system according to claim 1, wherein the required power generation amount calculating unit obtains an opening degree of an accelerator operated by a driver to calculate the required power generation amount.

* * * * *